(12) United States Patent
Piehler

(10) Patent No.: US 12,598,688 B2
(45) Date of Patent: Apr. 7, 2026

(54) EUV EXCITATION LIGHT SOURCE AND EUV LIGHT SOURCE

(71) Applicant: TRUMPF Lasersystems for Semiconductor Manufacturing GmbH, Ditzingen (DE)

(72) Inventor: Stefan Piehler, Stuttgart (DE)

(73) Assignee: TRUMPF LASERSYSTEMS FOR SEMICONDUCTOR MANUFACTURING GMBH, Ditzingen (DE)

( * ) Notice: Subject to any disclaimer, the term of this patent is extended or adjusted under 35 U.S.C. 154(b) by 338 days.

(21) Appl. No.: 18/503,221

(22) Filed: Nov. 7, 2023

(65) Prior Publication Data

US 2024/0074023 A1 Feb. 29, 2024

Related U.S. Application Data

(63) Continuation of application No. PCT/EP2021/062295, filed on May 10, 2021.

(51) Int. Cl.
H05G 2/00 (2006.01)
G02B 5/18 (2006.01)

(52) U.S. Cl.
CPC ......... H05G 2/0086 (2024.08); G02B 5/1861 (2013.01)

(58) Field of Classification Search
CPC ............................ H05G 2/0086; G02B 5/1861
See application file for complete search history.

(56) References Cited

U.S. PATENT DOCUMENTS

| | | | |
|---|---|---|---|
| 8,681,427 B2 | 3/2014 | Bergstedt et al. | |
| 9,129,717 B2 | 9/2015 | Lambert et al. | |
| 9,642,235 B2 | 5/2017 | Schulz et al. | |
| 9,888,555 B2 * | 2/2018 | Ando | G03F 7/70991 |
| 10,578,783 B2 * | 3/2020 | Brueck | G02B 5/1814 |
| 11,096,266 B2 * | 8/2021 | Riggs | H05G 2/0027 |
| 2006/0215712 A1 * | 9/2006 | Ziener | H05G 2/0088 372/5 |
| 2006/0255298 A1 * | 11/2006 | Bykanov | H05G 2/0088 250/504 R |

FOREIGN PATENT DOCUMENTS

WO  WO 2019192841 A1  10/2019

OTHER PUBLICATIONS

Wikipedia post entitled, "Optisches Gitter", last edited Aug. 16, 2023, retrieved from internet at https://de.wikipedia_org/wiki/Optisches_Gittler, last accessed Feb. 21, 2024.

(Continued)

*Primary Examiner* — Sean M Luck
(74) *Attorney, Agent, or Firm* — LEYDIG, VOIT & MAYER, LTD.

(57) ABSTRACT

An EUV excitation light source includes a laser source configured to emit a laser beam. The laser beam includes two partial beams having different wavelengths. The EUV excitation light source further includes a separating optical element for separating the two partial beams of the laser beam into two separated beams, and a superposition unit for superimposing the two separated beams at a predefined superposition location with a predefined superposition angle. The separating optical element includes a first reflective diffraction grating.

14 Claims, 2 Drawing Sheets

(56) References Cited

OTHER PUBLICATIONS

Wikipedia post entitled, "Blazegitter", last edited Dec. 27, 2022, retrieved from internet at https://de.wikipedia.org/wiki/Blazegitter, last accessed Feb. 21, 2024.

Marwan Abdou Ahmed et al., "Radially polarized 3kW beam from a $CO_2$ laser with an intracavity resonant grating mirror," Optics Letters, Jul. 1, 2007, pp. 1824-1826, vol. 32, Issue 13, Optica Publishing Group, Washington DC, USA.

* cited by examiner

EUV EXCITATION LIGHT SOURCE AND EUV LIGHT SOURCE

CROSS REFERENCE TO RELATED APPLICATIONS

This application is a continuation of and claims benefit to International Application No. PCT/EP2021/062295 (WO 2022/237952 A1), filed on May 10, 2021. The aforementioned application is hereby incorporated by reference herein.

FIELD

Embodiments of the present invention relate to an EUV excitation light source and an EUV light source comprising such an EUV excitation light source.

BACKGROUND

The trend to ever-smaller structures in the semiconductor industry requires the use of ever-smaller wavelengths of the light sources employed in their microlithographic fabrication. Extreme Ultraviolet (EUV) light is usually defined as electromagnetic radiation with a wavelength between approximately 10 and approximately 120 nanometers. In microlithography, EUV light more specifically refers to the wavelength regime between about 5 and 20 nanometers. As opposed to the current industry standard, which typically uses light with a wavelength of 193 nanometer, the use of EUV light allows for the reliable fabrication of much smaller structures and, hence, a corresponding increase in the performance of the devices.

One method to produce EUV light is based on irradiating a material, e.g. tin, with a high-intensity laser. Due to the irradiation, a plasma (so-called Laser Produced Plasma, LPP) is formed, which emits light in the EUV regime. As described in U.S. Pat. No. 8,681,427B2, a stream of droplets of the liquefied irradiated material can be formed and each droplet can sequentially be hit by two laser pulses. First, the droplet is hit by the first laser pulse, the so-called "pre-pulse", which deforms, enlarges, and/or vaporizes the droplet. Then, the droplet is hit by the second laser pulse, the so-called "main pulse", to form a plasma, which emits EUV light.

As the droplets move, the first laser pulse has to be focused at a first location and the second laser pulse has to be focused at a second location. Usually, both pulses are focused using the same focusing optical unit. This means that the two pulses have to superimpose at a superposition position at or near the focusing optical unit. The different focusing locations can then be obtained by choosing a suitable superposition angle of the first and second laser pulses at the superposition location.

Typically, however, the first and the second laser pulse which are emitted by the laser source propagate collinearly along the same beam path, i.e. they form two partial beams of the laser beam emitted by the laser source. Therefore, it is necessary to separate the two partial beams before focusing them at the corresponding focusing locations.

In order to separate the main pulse from the pre-pulse, the EUV excitation light source described in U.S. Pat. No. 8,681,427B2 has a dichroic beam splitter module. The dichroic beam splitter module comprises a dichroic element that is configured to pass the pre-pulse, yet to reflect the main pulse. The reflected main pulse is then further reflected by two mirrors from the first dichroic element to a second dichroic element and then to the irradiation site.

A similar EUV excitation light source is described in U.S. Pat. No. 9,129,717B2. In this light source, the pre-pulse and the main pulse that are separated by a beam splitter and are superimposed at a superposition mirror that operates in a transmitting way for laser beams impinging on one side of the superposition mirror and in a reflecting way for laser beams impinging on the other side thereof.

SUMMARY

Embodiments of the present invention provide an EUV excitation light source. The EUV excitation light source includes a laser source configured to emit a laser beam. The laser beam includes two partial beams having different wavelengths. The EUV excitation light source further includes a separating optical element for separating the two partial beams of the laser beam into two separated beams, and a superposition unit for superimposing the two separated beams at a predefined superposition location with a predefined superposition angle. The separating optical element includes a first reflective diffraction grating.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
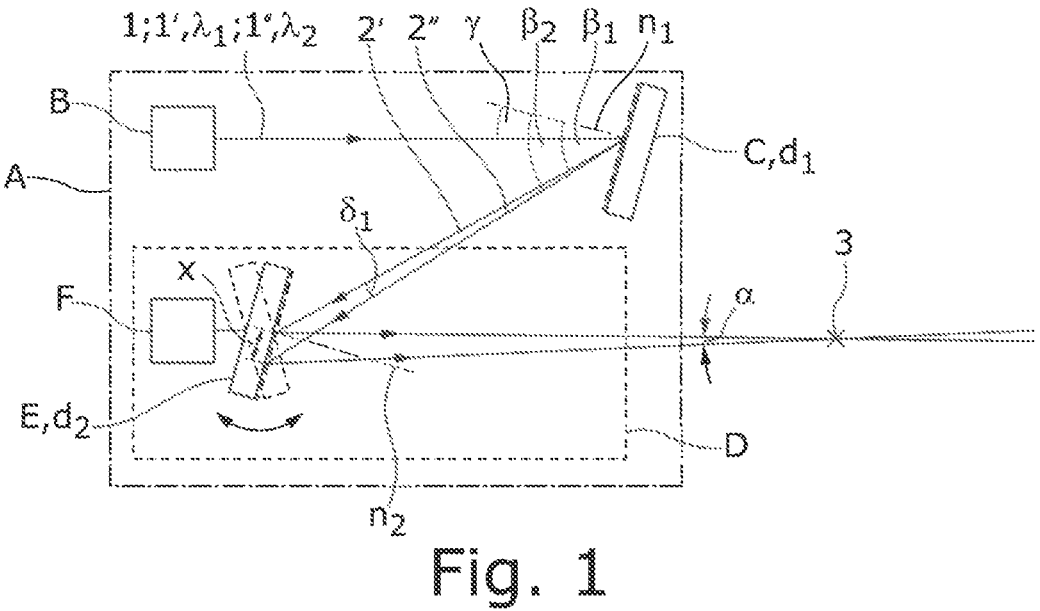
FIG. 1 shows a schematic illustration of an EUV excitation light source with a laser source, a separating optical element in the form of a first reflective diffraction grating, and a superposition unit that comprises one reflective diffraction grating, according to some embodiments.

Embodiments of the invention provide a cost-efficient EUV excitation light source that is suitable for high laser powers, and provide an EUV light source having such an EUV excitation light source.

A first aspect of the invention relates to an EUV excitation light source. The EUV excitation light source includes a laser source configured to emit a laser beam. The laser beam comprises two partial beams having different wavelengths. The EUV excitation light source further includes a separating optical element for separating the two partial beams of the laser beam into two separated beams, and a superposition unit for superimposing the two separated beams at a predefined superposition location with a predefined superposition angle. The separating optical element is a (first) reflective diffraction grating.

According to some embodiments, the laser beam comprising the two partial beams with different wavelengths is incident onto the separating optical element in the form of the first reflective diffraction grating. A diffractive grating is a diffractive optical element with a periodic structure that diffracts light into one or more diffraction orders due to interference effects. As these interference effects are wavelength-dependent, light with different wavelengths is diffracted at different angles at the diffraction grating. Hence, the two partial beams of the laser beam having different wavelengths are separated into two separated beams at the diffraction grating. These separated beams can then be manipulated via the superposition unit such that they superimpose at the predefined superposition location with the predefined superposition angle.

According to some embodiments, a reflective optical element in the form of a reflective diffraction grating is used as the separating element, rather than a partially transmissive optical element as described e.g. in U.S. Pat. Nos. 8,681, 427B2 and 9,129,717B2. This is advantageous, as the use of transmissive optical elements in EUV excitation light sources has several disadvantages. For instance, in order not to obstruct the beam path, transmissive optical elements can only be cooled via the small areas on their edge. This fact reduces the cooling efficiency in regions farther from the edge and limits the scaling of the maximum laser power with their diameter. This causes higher costs for the fabrication of the substrate and the application of the coating and contact elements and holders have to be designed in such a way that an efficient cooling is ensured, which is difficult to achieve at laser powers in the multi-kW-range.

Moreover, for the laser wavelengths used in the present light source, the substrates of the transmissive optical elements are usually made from diamond, which is very expensive. In addition, the fabrication costs of a diamond substrate increase disproportionally with the diameter of the substrate.

In contrast thereto, in a reflective diffraction grating, the diffracted beams are reflected and do not pass through the diffraction grating. As compared to the use of transmissive dichroic optical elements, this has several advantages, especially when working with high laser powers, such as the typical powers used in EUV excitation light sources of about 10 kW and above. First, the fabrication of reflective diffraction gratings is generally simpler and less expensive than the fabrication of transmissive dichroic optical elements. Second, reflective diffraction gratings can be cooled from the backside and, hence, more effectively. This allows one to work with smaller apertures, which in turn reduces the cost. Third, reflective diffraction gratings are, partly due to the fact that they can be cooled more effectively, less prone to damage caused by a laser beam, which results in an increased lifetime and allows one to work with higher laser powers.

It is advantageous if the superposition unit comprises only reflective optical elements, e.g. one or more reflective diffraction gratings and/or one or more mirrors.

In one embodiment, the superposition unit comprises a second reflective diffraction grating, both separated beams are incident onto the second reflective diffraction grating and the separated beams that are reflected by the second reflective diffraction grating superimpose at the superposition location with the superposition angle.

As in the case of the separating optical element, it is advantageous to use reflective optical elements in the superposition unit. One way to superimpose the separated beams is based on a second reflective diffraction grating. The two separated beams are incident onto the second reflective diffraction grating and diffracted at different angles in such a way that they superimpose at the superposition location. By suitably selecting the distance between the first reflective diffraction grating and the second reflective diffraction grating, the distance between the second reflective diffraction grating and the superposition location can be set to a desired value. By suitably selecting grating periods for the first diffraction grating and for the second diffraction grating, the superposition angle can be set to a desired value.

In one embodiment, the superposition unit comprises a tilting unit adapted for tilting the second diffraction grating to adjust the superposition location and/or the superposition angle.

By tilting the second diffraction grating using the tilting unit, the angles of incidence of the separated beams onto the second grating can be changed. This results in a change of the superposition angle, which can be continuously adjusted in this way. At the same time, this change in the angles of incidence results in a change of the superposition location and in the change of the alignment of the separated beams. These effects may be undesired and may be corrected by an additional deflection mirror.

In an alternative embodiment, a first grating period of the first reflective diffraction grating is identical to a second grating period of the second reflective diffraction grating, a surface normal of the first reflective diffraction grating is parallel to a surface normal of the second reflective diffraction grating, and the superposition unit further comprises a third reflective diffraction grating, wherein the separated beams that are reflected by the second reflective diffraction grating are incident onto the third reflective diffraction grating, and the separated beams that are reflected by the third reflective diffraction grating superimpose at the superposition location with the superposition angle.

A different way to superimpose the separated beams is based on a superposition unit comprising a second and a third reflective diffraction grating. The second reflective diffraction grating is chosen such that its grating period is identical to the grating period of the first reflective diffraction grating. Furthermore, a surface normal of the second reflective diffraction grating is parallel to a surface normal of the first reflective diffraction grating. If the same diffraction orders are used for the first and the second reflective diffraction grating, this means that the separated beams reflected by the second reflective diffraction grating are parallel. The superposition of the separated beams can then be achieved via the third reflective diffraction grating.

In this embodiment, it is possible to set the angle of incidence of the laser beam on the first reflective diffractive grating to zero so that the laser beam impinges on the first reflective diffraction grating in parallel to the surface normal. In this case, the second reflective diffraction grating and possibly also the third reflective diffraction grating are aligned in parallel to the first reflective diffraction grating.

In a further embodiment, the superposition unit comprises a tilting unit adapted for tilting the third diffraction grating to adjust the superposition angle and/or the superposition location.

By tilting the third diffraction grating using the tilting unit, the superposition angle can be continuously adjusted. An undesired change of the superposition location and/or of the alignment of the separated beams resulting therefrom can be corrected by an additional deflection mirror.

In one embodiment, the superposition unit comprises an adjustment unit for adjusting an optical path length between the first reflective diffraction grating and the second reflective diffraction grating to adjust the superposition location.

By adjusting the optical path length between the first reflective diffraction grating and the second reflective diffraction grating using the adjustment unit, the spatial separation between the first and the second separated beam on the second diffraction grating can be adjusted. In this way, the spatial separation between the first and the second partial beam on the last diffraction grating in the beam path and thus the distance between the last diffraction grating and the superposition location can be continuously adjusted.

In one embodiment, the adjustment unit for adjusting the optical path length between the first reflective diffraction grating and the second reflective diffraction grating comprises a first pair of mirrors and a second pair of mirrors, the adjustment unit being adapted to adjust the optical path length by varying a distance between the first pair of mirrors and the second pair of mirrors. The adjustment unit may be designed in the way of a conventional optical delay line, which allows to adjust the optical path length by varying the distance between a first pair of mirrors e.g. forming a retroreflector and a second pair of mirrors.

Using such a conventional optical delay line, the separated beams are first incident onto the first of the two mirrors of the first pair and reflected onto the first mirror of the retroreflector. The separated beams that are retroreflected at the second mirror of the retroreflector are then incident onto the second mirror of the first pair of mirrors from which they are reflected to the second reflective diffraction grating. The optical path length between the first reflective diffraction grating and the second reflective diffraction grating is then adjusted by varying the distance between the retroreflector and the two mirrors. This distance variation can for example be achieved by a motorized or piezo-actuated linear translation stage. Using such an adjustment unit, aside from changing the spatial distance between the two separated beams on the second diffraction grating, the angle between the two partial beams is not altered while the optical path length is varied.

In an alternative embodiment, the superposition unit comprises a first mirror and a second mirror, wherein the first separated beam is incident onto the first mirror and the second separated beam is incident onto the second mirror, the first mirror and the second mirror being arranged to superimpose the separated beams reflected by the mirrors at the superposition location with the superposition angle.

A different way to superimpose the separated beams is based on a superposition unit that comprises two (or more) mirrors, rather than one or more reflective diffraction gratings (and possibly one or more mirrors). As compared to the use of a second reflective diffraction grating, this is a simple and cost-efficient solution. However, the distance or spatial separation between the separated beams is determined by their separation in wavelength and by the optical path length between the first reflective diffraction grating and the two mirrors. As the first separated beam has to be incident onto the first mirror while the second separated beam has to be incident onto the second mirror, a certain minimal distance between the two separated beams impinging on the first and second mirror is needed. This fact limits this approach to laser beams comprising partial beams that are sufficiently separated in wavelength, or to a large distance between the first diffraction grating and the mirrors. The longer the optical path length, the smaller the needed separation in wavelength.

In a further embodiment, the superposition unit comprises an extension unit for extending an optical path length between the first reflective diffraction grating and the first and second mirror.

By extending the optical path length between the first reflective diffraction grating and the two mirrors, the needed separation in wavelength can be reduced. A corresponding extension unit may comprise two or several additional mirrors. For example, the two separated beams may be incident onto a mirror, reflected onto another mirror, and bounce back and forth between these mirrors several times, such that their optical path length is substantially extended.

In one embodiment, the superposition unit comprises a tilting unit adapted for tilting the first mirror and/or the second mirror to adjust the superposition position and/or the superposition angle.

By tilting the first mirror and/or the second mirror using the tilting unit, the superposition location and the superposition angle can be continuously adjusted. However, without any additional optical elements it is in general not possible to adjust these quantities independently. Any change in one or both of the tilting angles causes a change in both the superposition location and the superposition angle.

In one embodiment, the superposition unit further comprises at least one deflection mirror for deflecting both separated beams and a tilting unit for tilting the deflection mirror to adjust the superposition location.

While the tilting units used to tilt the reflective diffraction gratings or the first and/or second mirror allow to adjust the superposition location and the superposition angle, full independent control over both of these quantities is in general only obtained if the superposition unit additionally comprises a deflection mirror and a tilting unit for tilting the deflection mirror. In this case, both separated beams are incident onto the deflection mirror. By tilting the deflection mirror, the superposition location can be adjusted, while the distance between the deflection mirror and the superposition location as well as the superposition angle are kept constant.

In one embodiment, at least one of the first, second and third reflective diffraction gratings are blazed gratings or resonant waveguide gratings.

In conventional diffraction gratings, the laser power is distributed among the different diffracted beams corresponding to the different diffraction orders. This fact typically leads to a reduced efficiency of the EUV excitation light source if conventional diffraction gratings are used.

Blazed gratings are a well-established type of diffraction gratings. A blazed grating has a sawtooth-shaped cross section, which causes an almost optimal concentration of laser power in the desired diffraction order.

Resonant waveguide gratings are a more recent development that can serve the same purpose of concentrating a very large fraction of the laser power in the desired diffraction order. Their principle of operation relies on resonances that are caused by the interaction with quasi-guided modes, see e.g. the article "Radially polarized 3 kW beam from a $CO_2$ laser with an intracavity resonant grating mirror", M. A. Ahmed et al., Optics Letters, 32(13), 1824-1826.

In a further embodiment, at least one of the first, second and third reflective diffraction gratings comprise a substrate made of a material selected from the group consisting of: Cu, SiC, Si and diamond. These (and other) materials have a high thermal conductivity and allow for a good heat removal. Moreover, the manufacturing processes for forming a reflective diffraction grating based on these substrate materials are relatively simple. For instance, the diffraction grating may be formed using a lithographic process on substrates made of SiC or Si. When using Cu as a substrate material, it is possible to generate the diffraction grating directly on the substrate by diamond turning. When using diamond as a substrate material, the diffraction grating is typically applied in the form of a coating. The use of diamond as a substrate material is advantageous, as (synthetic) diamond has a very high thermal conductivity and can be cooled over the entire backside when using it as a substrate for a reflective diffraction grating. Therefore, when using a diamond substrate, the aperture or diameter of the reflective optical elements can be reduced considerably, allowing to reduce installation space of the optical assembly. In this way, production costs can be reduced and the availability of the optical elements can be increased.

According to a second aspect, this object is achieved by an EUV light source with such an EUV excitation light source, a vacuum chamber comprising an irradiation region, and a focusing unit for focusing the first partial beam and the second partial beam in the irradiation region. The EUV light source typically further comprises a target material delivery system, which delivers droplets of a target material, e.g. tin, into the irradiation region. The first partial beam (pre-pulse) and the second partial beam (main pulse) are typically focused at different focusing locations in the irradiation region to irradiate a droplet of the target material that is delivered to the vacuum chamber by the target material delivery system. For focusing the partial beams in the irradiation region, the first and the second partial beams are superimposed at the superposition location at or close to the focusing unit that may comprise one or more reflective or transmissive optical elements.

The spatial separation of the two focusing locations in the irradiation region is typically very small, e.g. in the range of several hundred micrometers, e.g. from 100 µm to 300 µm. Based on a typical path length of the partial beams from the superposition location to the irradiation region, the superposition angle at the superposition location is generally also very small, typically less than 50 mrad, less than 30 mrad or less than 3 mrad.

Further advantages of the invention may be found in the description and the drawing. Likewise, the features mentioned above and those referred to below may be used independently, or several of them may be used in any desired combinations. The embodiments shown and described are not to be interpreted as an exhaustive list, but rather have an exemplary nature for description of the invention.

In the following description of the drawings, identical references are used for components which are the same or functionally equivalent.

FIG. 1 shows an EUV excitation light source A. The EUV excitation light source A comprises a laser source B, a separating optical element C, and a superposition unit D. The laser source B is designed to emit a laser beam $1$, which comprises two partial beams $1'$,$1''$ having different wavelengths $\lambda_1$, $\lambda_2$. The two partial beams $1'$,$1''$ of the laser beam $1$ are separated into two separated beams $2'$,$2''$ using the separating optical element C. The two separated beams $2'$,$2''$ are superimposed using the superposition unit D at a predefined (desired) superposition location $3$ with a predefined (desired) superposition angle $\alpha$. The superposition angle $\alpha$ is typically very small, e.g. less than 50 mrad, 30 mrad or 3 mrad.

The laser source B is designed to generate the two partial beams $1'$,$1''$ with different wavelengths $\lambda_1$, $\lambda_2$ either using a single laser resonator or using two laser resonators. In either case, the partial beams $1'$,$1''$ forming the laser beam $1$ are superimposed and propagate collinearly along the same beam path when impinging on the separating optical element C. In the present example, the laser source B is a $CO_2$ laser source that generates the first partial beam $1'$ with a first wavelength $\lambda_1$ of 10.59 µm and the second partial beam $1''$ with a second wavelength $\lambda_2$ of 10.207 µm. Other types of laser sources, e.g. solid state laser sources or fiber laser sources, may be used as well as the laser source B of the EUV excitation light source A.

The laser beam $1$ comprising the two partial beams $1'$,$1''$ having different wavelengths $\lambda_1$, $k_2$ is incident onto the separating optical element that forms a first reflective diffraction grating C. According to the grating equation, light with a wavelength $\lambda_\alpha$ that is incident onto the first diffraction grating C under an angle $\gamma$ with respect to the surface normal n$1$ is diffracted at an angle $$\beta_a = \arcsin\left(m \cdot \frac{\lambda_a}{d_1} - \sin(\gamma)\right), \tag{1}$$

where $d_1$ is the grating period of the first diffraction grating C, m is the diffraction order and, in the present example of a laser beam $1$ having two wavelengths $\lambda_1$, $\lambda_2$, $\alpha=1$, 2. Thus, light with different wavelengths $\lambda_a$ is diffracted at different angles $\beta_a$ at the first diffraction grating C. This wavelength-dependence is used to separate the two partial beams $1'$,$1''$ of the laser beam $1$ into the two separated beams $2'$,$2''$.

The angular separation of the two separated beams $2'$,$2''$ diffracted from the first diffraction grating C is given by $$\delta_1 = \beta_1 - \beta_{w}. \tag{2}$$

The superposition unit D comprises a second reflective diffraction grating E, onto which the separated beams $2'$,$2''$ are incident. Let $L_1$ be the distance between the first reflective diffraction grating C and the second reflective diffraction grating E, then the angular separation $\delta_1$ of the two separated beams $2'$,$2''$ results in a spatial separation of the two separated beams $2'$, $2''$ at the second reflective diffraction grating E of $$x \approx L_1 \cdot \delta_1. \tag{3}$$

At the second reflective diffraction grating E, the two separated beams $2'$,$2''$ are again diffracted at different angles $\varphi_1$, $\varphi_2$ according to:

$$\varphi_a = \arcsin\left(n \cdot \frac{\lambda_a}{d_2} - \sin(\gamma_a)\right), \tag{4}$$

wherein $d_2$ is the grating period of the second diffraction grating E, n is the diffraction order, and $\gamma_a$ is the respective angle of incidence and $\alpha=1$, 2. The condition $\gamma_a = \beta_a$ applies when the first reflective diffraction grating C and the second reflective diffraction grating E are arranged parallel to each other, i.e. when the surface normal $n_1$ of the first reflective diffraction grating C and the surface normal $n_2$ of the second reflective diffraction grating E are arranged parallel to each other, as is the case in FIG. 1.

A second angular separation $\delta_2$ of the two separated beams $2'$,$2''$ diffracted from the second diffraction grating E is given by $$\delta_2 = \varphi_1 - \varphi_2. \tag{5}$$

By suitably selecting the grating period $\delta_1$ for the first diffraction grating C and the grating period $\delta_2$ for the second diffraction grating E, the second angular separation $\delta_2$ of the two separated beams 2', 2" diffracted at the second diffraction grating E can be set to a desired value. The two separated beams 2', 2" superimpose at the superposition location 3 with a superposition angle $\alpha$ that coincides with the second angular separation $\delta_2$ (i.e. $\delta=\delta_2$).

The distance between the second reflective diffraction grating E and the superposition location 3 is given by $$L_2 \approx \frac{x}{\alpha} \approx L_1 \cdot \frac{\delta_1}{\alpha}. \qquad (6)$$

Thus, by suitably selecting the distance $L_1$ between the first reflective diffraction grating C and the second reflective diffraction grating E, the distance $L_2$ between the second reflective diffraction grating E and the superposition location 3 can be set to a desired value. Therefore, the two partial beams 1',1" can be superimposed at an arbitrary distance $L_2$ from the second reflective diffraction grating E.

The superposition unit D further comprises a tilting unit F for tilting the second reflective diffraction grating E to adjust the superposition location 3 and the superposition angle $\alpha$. Tilting the second reflective diffraction grating E results in a change of the angles of incidence $\gamma_a$ of the two separated beams 2',2" onto the second reflective diffraction grating E so that these no longer coincide with the diffraction angles $\beta_1$, $\beta_2$ in equation (4). As evident from equation (4), a change of the angle of incidence $\gamma_a$ results in a change of the diffraction angle $\varphi_a$. As a result, the superposition angle $\alpha$ can be adjusted by tilting the second reflective diffraction grating E. At the same time, tilting the second reflective diffraction grating E results in an overall tilt of both separated beams 2',2" and a change of the superposition location 3.

As is shown in FIG. 1, the superposition unit D is designed to align the first separated beam 2' at the superposition location 3 in parallel to the laser beam 1 that is incident on the first reflective diffraction grating C when the second diffraction grating E is arranged in parallel to the first diffraction grating C. The tilt of the second diffraction grating E can be compensated and the parallel alignment of the first separated beam 2' to the laser beam 1 can be maintained as well as an additional control over the superposition location 3 can be obtained using one or more (possibly tiltable) deflection mirrors, which are not depicted here.

Figure 2:
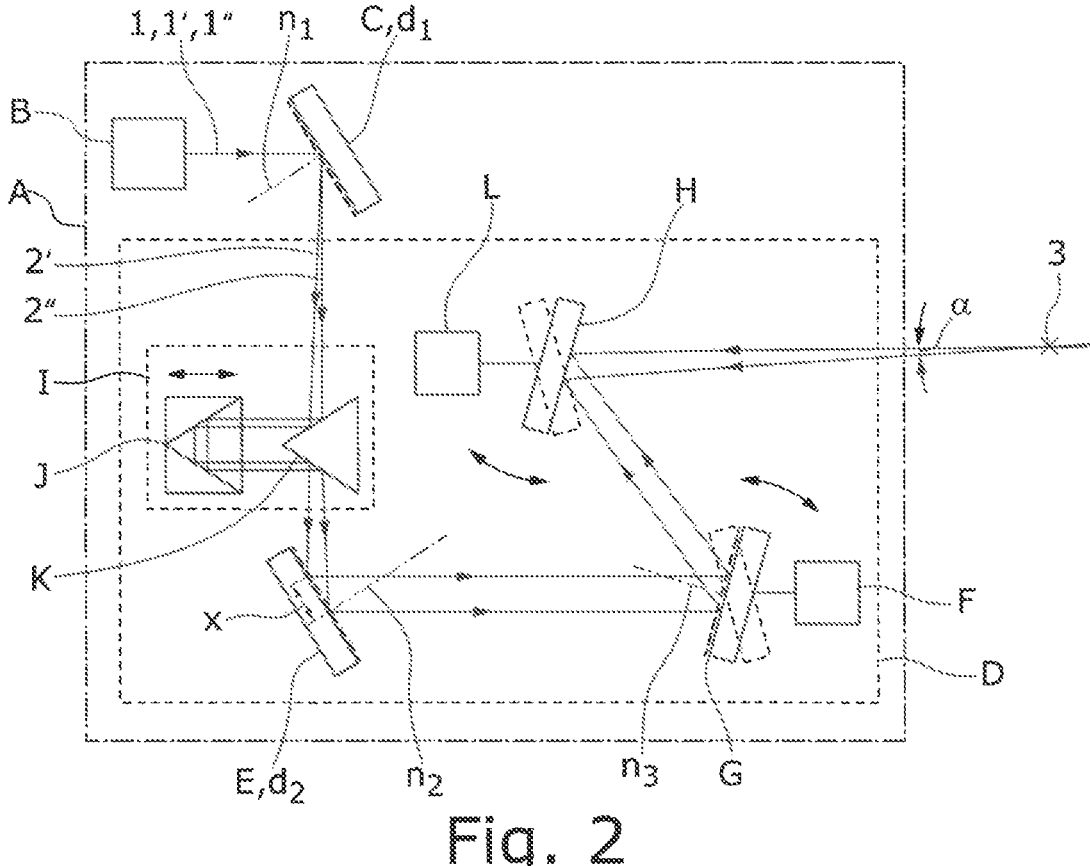
FIG. 2 shows a schematic illustration of an EUV excitation light source analogous to the one shown in FIG. 1, wherein the superposition unit comprises two reflective diffraction gratings, according to some embodiments.

FIG. 2 shows an EUV excitation light source A analogous to the one shown in FIG. 1, wherein the superposition unit B comprises a third reflective diffraction grating G in addition to the second reflective diffraction grating E. The laser beam 1 comprising the two partial beams 1',1" is incident onto the separating optical element C that forms the first reflective diffraction grating C. Due to the wavelength-dependence of the diffraction angle $\beta_\alpha$ at the first reflective diffraction grating C, the two partial beams 1',1" having different wavelengths $\lambda_\alpha$ are separated into the two separated beams 2',2". The two separated beams 2',2" are incident onto the second reflective diffraction grating E, where they are diffracted at the angles $\varphi_1$ and $\varphi_2$. The grating period $d_2$ of the second reflective diffraction grating E is the same as the grating period $d_1$ of the first reflective diffraction grating C, $d_1=d_2$. Furthermore, the second reflective diffraction grating E is arranged in parallel to the first reflective diffraction grating C, implying the condition $\gamma_a=\beta_2$, and the same diffraction orders are used, n=m. As a consequence, it follows from equation (4) and equation (5) that $$\square a = \gamma \qquad (7)$$

which means that the two separated beams 2',2" that are reflected by the second reflective diffraction grating E are parallel to each other and parallel to the laser beam 1 that is incident onto the first reflective diffraction grating C. Thus, the spatial separation x of the two separated beams 2',2" at the second reflective diffraction grating E is maintained.

The two separated beams 2',2" that are reflected by the second reflective diffraction grating E are incident onto the third reflective diffraction grating G, where they are again diffracted at different angles $\varepsilon_1$, $\varepsilon_2$ according to:

$$\varepsilon_a = \arcsin\left(l \cdot \frac{\lambda_a}{d_3} - \sin(\zeta_a)\right), \qquad (8)$$

where $d_3$ is the grating period of the third diffraction grating G, l is the diffraction order, and $\zeta_\alpha$ is the respective angle of incidence and $\alpha=1, 2$.

Following diffraction at the third diffraction grating G, the two separated beams 2',2" have an angular separation $\delta_3$ given by $$\delta_3 = \varepsilon_1 - \varepsilon_2. \qquad (9)$$

Subsequently, the two separated beams 2', 2" are deflected by a deflection mirror H and superimpose at the superposition location 3 with a superposition angle $\alpha$ that coincides with the third angular separation $\delta_3$ (i.e. $\alpha=\delta_3$).

The optical path length $L_3$ between the third reflective diffraction grating G and the superposition location 3 is given by $$L_3 \approx \frac{x}{\alpha} \approx L_1 \cdot \frac{\delta_1}{\alpha}. \qquad (10)$$

Thus, analogously to the situation for the superposition unit D shown in FIG. 1, by suitably selecting the distance $L_1$ between the first reflective diffraction grating C and the second reflective diffraction grating E, the optical path length $L_3$ between the third reflective diffraction grating G and the superposition location 3 can be set to a desired value. This is conveniently achieved via an adjustment unit I for adjusting the optical path length $L_1$ between the first reflective diffraction grating C and the second reflective diffraction grating E. In the present example, the adjustment unit I comprises a first pair of mirrors J and a second pair of mirrors K. The optical path length $L_1$ between the first reflective diffraction grating C and the second reflective diffraction grating E is then adjusted by varying the distance between the first pair of mirrors J and the second pair of mirrors K.

The superposition unit D further comprises a tilting unit F for tilting the third reflective diffraction grating G that has an analogous function to the tilting unit F for tilting the second reflective diffraction grating E shown in FIG. 1.

A further tilting unit L is used for tilting the deflection mirror H. By tilting the deflection mirror H, the superposition location 3 can be adjusted and the overall tilt of the two separated beams 2',2" can be compensated or adjusted, while the optical path length $L_3$ between the third reflective diffraction grating G and the superposition location 3 as well as the superposition angle α are kept constant. In general, more additional deflection mirrors and corresponding tilting units may be used for this purpose.

It will be understood that in the example shown in FIG. 2, the adjustment unit I is not necessary. Moreover, it is possible to set the angle of incidence γ of the laser beam 1 on the first reflective diffractive grating C to zero (γ=0) so that the laser beam 1 impinges on the first reflective diffraction grating in parallel to the surface normal n1. In this case, both the second reflective diffraction grating E and the third reflective diffraction grating G can be arranged in parallel to the first reflective diffraction grating C, so that the the surface normals $n_1$, $n_2$, $n_3$ of all three diffraction gratings C, E, G are aligned in parallel, e.g. in the horizontal direction in FIG. 2.

Figure 3:
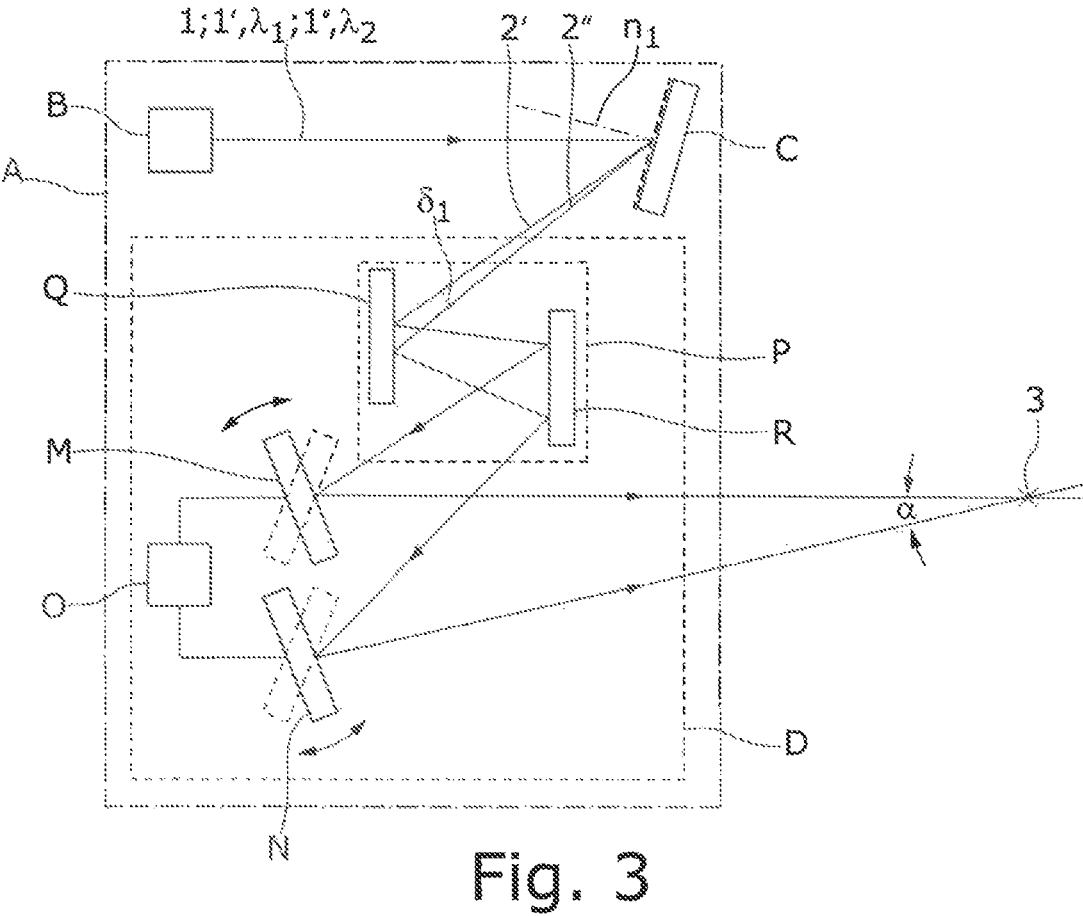
FIG. 3 shows a schematic illustration of an EUV excitation light source analogous to the one shown in FIG. 1, wherein the superposition unit comprises two mirrors, according to some embodiments.

FIG. 3 shows an EUV excitation light source A analogous to the one shown in FIG. 1, wherein the superposition unit D comprises a first mirror M and a second mirror N. The laser beam 1 comprising the two partial beams 1',1" is separated into the two separated beams 2',2" by the separating optical element C that forms the first reflective diffraction grating C. The first separated beam 2' is incident onto the first mirror M, while the second separated beam 2" is incident onto the second mirror N. After their reflection at the respective mirrors M,N, the two separated beams 2',2" superimpose at the superposition location 3 with the superposition angle α.

By appropriately selecting the position and orientation of the first mirror M and the second mirror N, the superposition location 3 and the superposition angle α can be set to desired values.

As the first separated beam 2' is incident onto the first mirror M, while the second separated beam 2" is incident onto the second mirror N, a minimum spatial separation of the two separated beams 2',2" that is at least equal to the diameter of the separated beams 2',2" or the diameter of the laser beam 1 is needed. For instance, if the beam diameter of the laser beam 1 is 30 mm and the distance between the first reflective diffraction grating C and the superposition location 3 is about 1 m, the separation angle $\delta_1$ is about 30 mrad. If the distance between the first reflective diffraction grating C and the superposition location 3 is about 10 m, the separation angle $\delta_1$ is about 3 mrad. Therefore, for the embodiment of FIG. 3, a large distance between the first reflective diffraction grating C and the superposition location 3 and/or a relatively large superposition angle of more than e.g. 10 mrad is advantageous.

In addition, if the difference between the wavelength $\lambda_1$ of the first partial beam 1' and the wavelength $\lambda_2$ of the second partial beam 1" is small, a large optical path length between the first diffraction grating C and the mirrors N, M is of advantage, which can be obtained using an extension unit P for extending the optical path length. In the present example, the extension unit P comprises a first additional mirror Q and a second additional mirror R. The two separated beams 2',2" are incident onto the first additional mirror Q and reflected onto the second additional mirror R before being incident onto the mirrors N, M, which results in an extension of the optical path length between the first diffraction grating C and the mirrors N, M. A similar extension unit may be used for extending the beam path between the first mirror M and/or the second mirror N and the superposition location 3.

The superposition unit D of FIG. 3 also comprises a tilting unit O. By tilting the first mirror M and/or the second mirror N using the tilting unit O, the superposition location 3 and the superposition angle α can be continuously adjusted as indicated above. By tilting the first and second mirrors M, N individually, a high flexibility for adjusting the superposition angle α is provided.

The three diffraction gratings C, E, G shown in FIG. 1 to FIG. 3 are preferably configured so that the power diffracted into the desired diffraction order m, n, etc. is maximized. Suitable types of diffraction gratings C, E, G that meet this requirement include blazed gratings and resonant waveguide gratings. Blazed gratings comprise a structure with one or more blaze angles in order to provide a diffraction efficiency of almost 100% into the desired diffraction order (see e.g. "https://en.wikipedia.org/wiki/Blazed_grating"). Resonant waveguide gratings may also be optimized for this purpose. In particular when using wavelengths in the near infrared range (NIR) as is the case with the light source described herein, diffraction efficiencies of (almost) 100%, e.g. 99% or 98%, have been demonstrated. The suitability of resonant wavelength gratings for high laser powers of more than 3 kW has been shown e.g. in the article of M. A. Ahmed et al. cited above for a $CO_2$ laser with an intracavity resonant mirror configured to produce radially polarized laser radiation. In contrast thereto, in conventional diffraction gratings, the laser power is distributed among the different diffracted beams corresponding to the different diffraction orders. Therefore, the use of conventional diffraction gratings in the EUV excitation light source A causes a loss of laser power that is not diffracted into the desired diffraction order.

The three diffraction gratings C, E, G are formed on a substrate made from a material suitable for high laser powers of more than 10 kW. Such materials generally have a high thermal conductivity to allow for efficient cooling. Suitable materials include, among others, Cu, SiC, Si and (synthetic) diamond. The use of diamond as a substrate material is advantageous, as (synthetic) diamond has a very high thermal conductivity and can be cooled over the entire backside when using it as a substrate for a reflective diffraction grating C, E, G. Therefore, when using a diamond substrate, the diameter of the reflective diffraction gratings C, E, G can be reduced considerably as compared to the case when a diamond substrate is used for a transmissive optical element, thus allowing to reduce the installation space of the EUV excitation light source.

Figure 4:
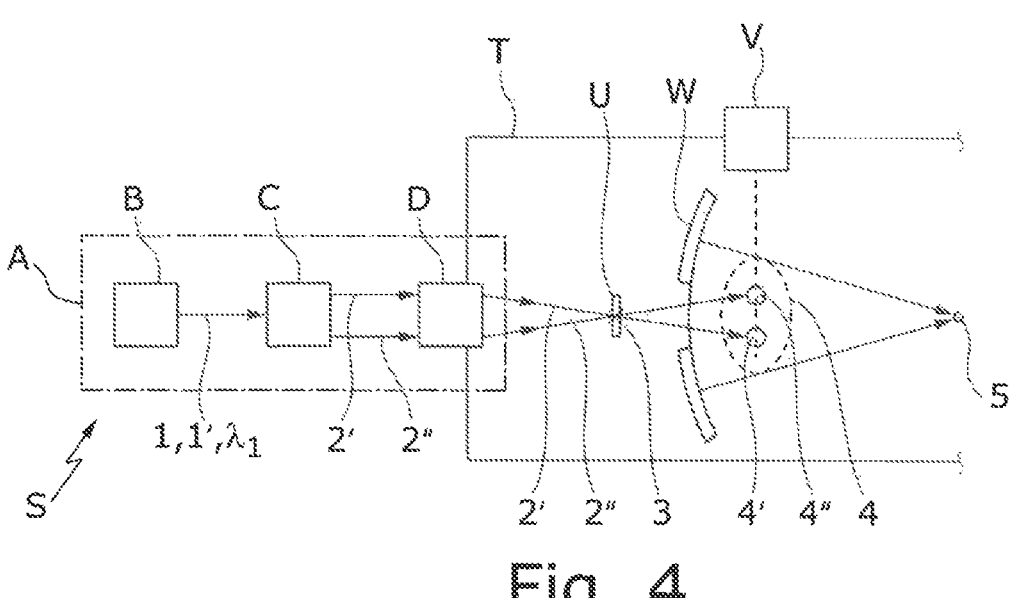
FIG. 4 shows a schematic illustration of an EUV light source with such an EUV excitation light source, according to some embodiments.

FIG. 4 shows an EUV light source S with an EUV excitation light source A as shown in FIG. 1 to FIG. 3. The EUV light source S comprises a vacuum chamber T with an irradiation region 4, and a focusing unit U. The first separated beam 2' and the second separated beam 2" superimpose at the superposition location 3 with the superposition angle α. The focusing unit U, more specifically a first optical element of the focusing unit U, e.g. a mirror, is arranged at the superposition location 3. The first separated beam 2' and the second separated beam 2" are focused using the focusing unit U in the irradiation region 4 at a first focusing location 4' and a second focusing location 4", respectively. Although the focusing unit U is arranged in the vacuum chamber T in FIG. 4, this is not necessary: The focusing unit U, or at least part of the focusing unit U may be arranged outside of the vacuum chamber T.

The EUV light source S further comprises a target material delivery system V, which delivers droplets of a target material into the irradiation region 4. Each target material droplet is first irradiated at the first focusing location 4' by the first separated beam 2' and subsequently irradiated at the second focusing location 4" by the second separated beam 2". Upon irradiation of the target material droplets, a plasma is formed, which emits EUV radiation. The EUV radiation is collected and focused via an optical element W at an EUV focusing location 5. For example, the optical element W may be an ellipsoidal mirror.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An EUV excitation light source, comprising:
   a laser source configured to emit a laser beam, the laser beam comprising two partial beams having different wavelengths,
   a separating optical element for separating the two partial beams of the laser beam into two separated beams, and
   a superposition unit for superimposing the two separated beams at a predefined superposition location with a predefined superposition angle,
   wherein the separating optical element comprises a first reflective diffraction grating.

2. The EUV excitation light source according to claim 1, wherein the superposition unit comprises a second reflective diffraction grating, wherein both of the separated beams are incident onto the second reflective diffraction grating, and the separated beams that are reflected by the second reflective diffraction grating superimpose at the superposition location with the superposition angle.

3. The EUV excitation light source according to claim 2, wherein the superposition unit comprises a tilting unit configured for tilting the second reflective diffraction grating to adjust the superposition location and/or the superposition angle.

4. The EUV excitation light source according to claim 2, wherein a first grating period of the first reflective diffraction grating is identical to a second grating period of the second reflective diffraction grating, a surface normal of the first reflective diffraction grating is parallel to a surface normal of the second reflective diffraction grating, and the superposition unit further comprises a third reflective diffraction grating, wherein the separated beams that are reflected by the second reflective diffraction grating are incident onto the third reflective diffraction grating, and the separated beams that are reflected by the third reflective diffraction grating superimpose at the superposition location with the superposition angle.

5. The EUV excitation light source according to claim 4, wherein the superposition unit comprises a tilting unit configured for tilting the third reflective diffraction grating to adjust the superposition angle and/or the superposition location.

6. The EUV excitation light source according to claim 2, wherein the superposition unit comprises an adjustment unit for adjusting an optical path length between the first reflective diffraction grating and the second reflective diffraction grating to adjust the superposition location.

7. The EUV excitation light source according to claim 6, wherein the adjustment unit for adjusting the optical path length between the first reflective diffraction grating and the second reflective diffraction grating comprises a first pair of mirrors and a second pair of mirrors, wherein the adjustment unit is configured to adjust the optical path length by varying a distance between the first pair of mirrors and the second pair of mirrors.

8. The EUV excitation light source according to claim 1, wherein the superposition unit comprises a first mirror and a second mirror, wherein a first separated beam of the two separated beams is incident onto the first mirror and a second separated beam of the two separated beams is incident onto the second mirror, the first mirror and the second mirror being configured to superimpose the separated beams reflected by the first mirror and the second mirror, respectively, at the superposition location with the superposition angle.

9. The EUV excitation light source according to claim 8, wherein the superposition unit comprises an extension unit for extending an optical path length between (i) the first reflective diffraction grating and (ii) the first mirror or the second mirror.

10. The EUV excitation light source according to claim 8, wherein the superposition unit comprises a tilting unit configured for tilting the first mirror and/or the second mirror to adjust the superposition location and/or the super-position angle.

11. The EUV excitation light source according to claim 1, wherein the superposition unit further comprises at least one deflection mirror for deflecting both of the separated beams and a tilting unit for tilting the deflection mirror to adjust the superposition location.

12. The EUV excitation light source according to claim 1, wherein at least one of the first reflective diffraction grating, the second reflective diffraction grating, and the third reflective diffraction grating is a blazed grating or a resonant waveguide grating.

13. The EUV excitation light source according to claim 1, wherein at least one of the first reflective diffraction grating, the second reflective diffraction grating, and the third reflective diffraction grating is a substrate made of a material selected from the group consisting of Cu, SiC, Si and diamond.

14. An EUV light source comprising:
   an EUV excitation light source according to claim 1,
   a vacuum chamber comprising an irradiation region, and
   a focusing unit for focusing the separated beams in the irradiation region.

* * * * *